United States Patent [19]
Croft et al.

[11] Patent Number: 5,974,351
[45] Date of Patent: Oct. 26, 1999

[54] MULTIPLEXED ELECTRONIC CONTROL SYSTEMS

[75] Inventors: Andrew Croft, Rugby; Ian Robert Kendall, Nr Tamworth; Ian Robert Smith, Conventry, all of United Kingdom

[73] Assignee: Jaguar Cars Limited, Allesley, Coventry, United Kingdom

[21] Appl. No.: 08/813,420

[22] Filed: Mar. 10, 1997

[30] Foreign Application Priority Data

Mar. 9, 1996 [GB] United Kingdom .................... 9605048

[51] Int. Cl.⁶ .................................................. G06F 19/00
[52] U.S. Cl. .................................... 701/48; 701/1; 701/53
[58] Field of Search ................................. 701/1, 36, 48, 701/53; 370/229, 235, 236, 242, 360, 445 447, 462; 340/825.16, 825.5; 307/10.1

[56] References Cited

U.S. PATENT DOCUMENTS

| | | | |
|---|---|---|---|
| 4,942,571 | 7/1990 | Möller et al. | 307/10.1 |
| 4,964,076 | 10/1990 | Schurk | 340/825.5 |
| 5,187,709 | 2/1993 | Williamson et al. | 340/825.5 |
| 5,189,617 | 2/1993 | Shiraishi | 701/1 |
| 5,243,596 | 9/1993 | Port et al. | 370/60 |
| 5,251,211 | 10/1993 | Mutoh et al. | 370/445 |
| 5,343,470 | 8/1994 | Hideshima et al. | 370/462 |
| 5,450,403 | 9/1995 | Ichii et al. | 340/825.16 |
| 5,629,941 | 5/1997 | Kawanishi et al. | 370/236 |

FOREIGN PATENT DOCUMENTS

| | | |
|---|---|---|
| 0425 199 A2 | 5/1991 | European Pat. Off. . |
| 0 612 169 A2 | 8/1994 | European Pat. Off. . |
| 681 383 A1 | 11/1995 | European Pat. Off. . |
| 195 05 294 A1 | 8/1995 | Germany . |
| 2213 969 | 8/1989 | United Kingdom . |
| 2271 453 | 4/1994 | United Kingdom . |

*Primary Examiner*—Gary Chin
*Attorney, Agent, or Firm*—Paul K. Godwin

[57] ABSTRACT

A network monitor in a multiplex control system monitors the condition of the network and individual modules of the system by causing individual modules in the system to generate, at regular time intervals, a unique identifying message and to monitor the identifying messages to individually determine the condition of the system.

11 Claims, 4 Drawing Sheets

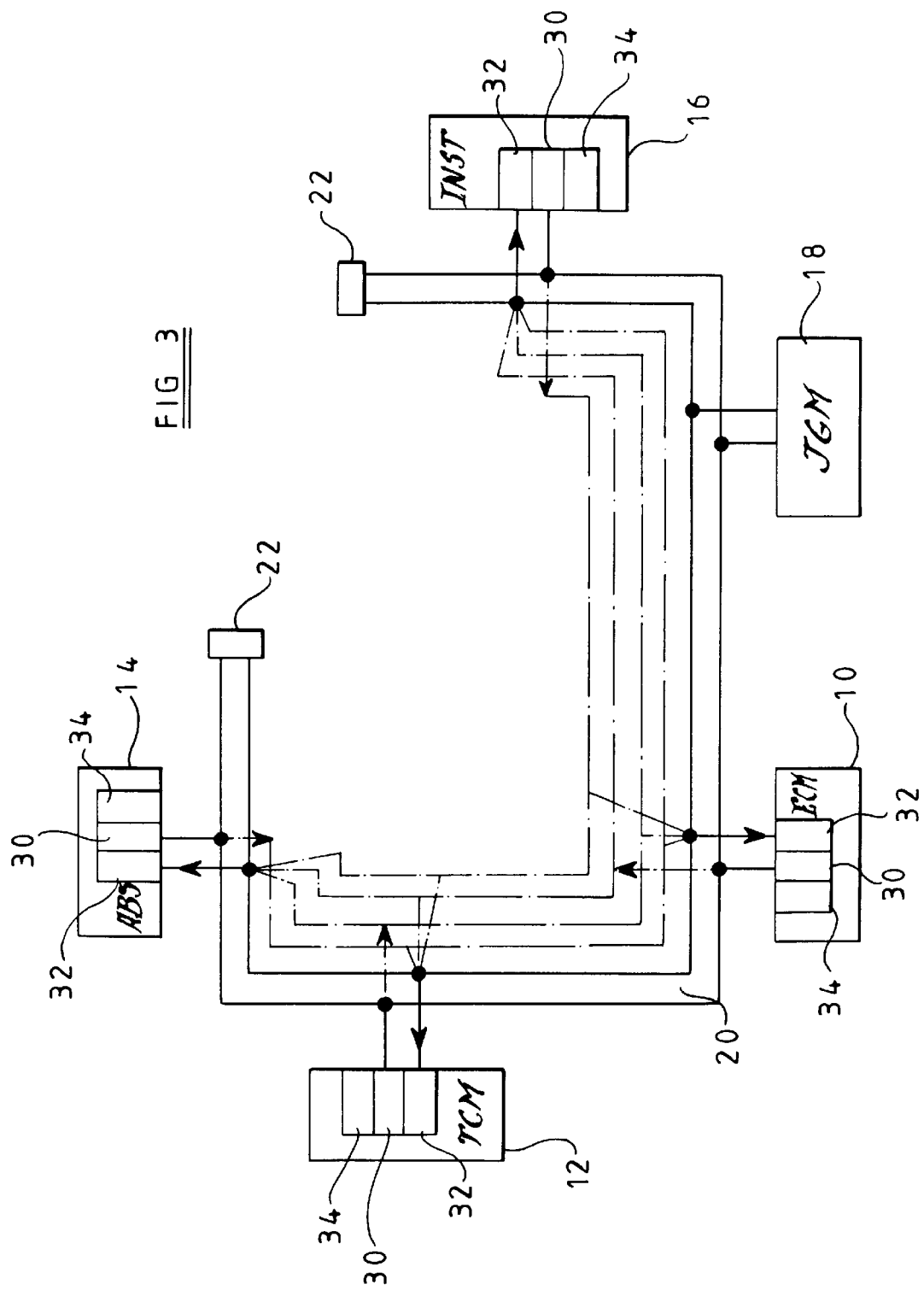

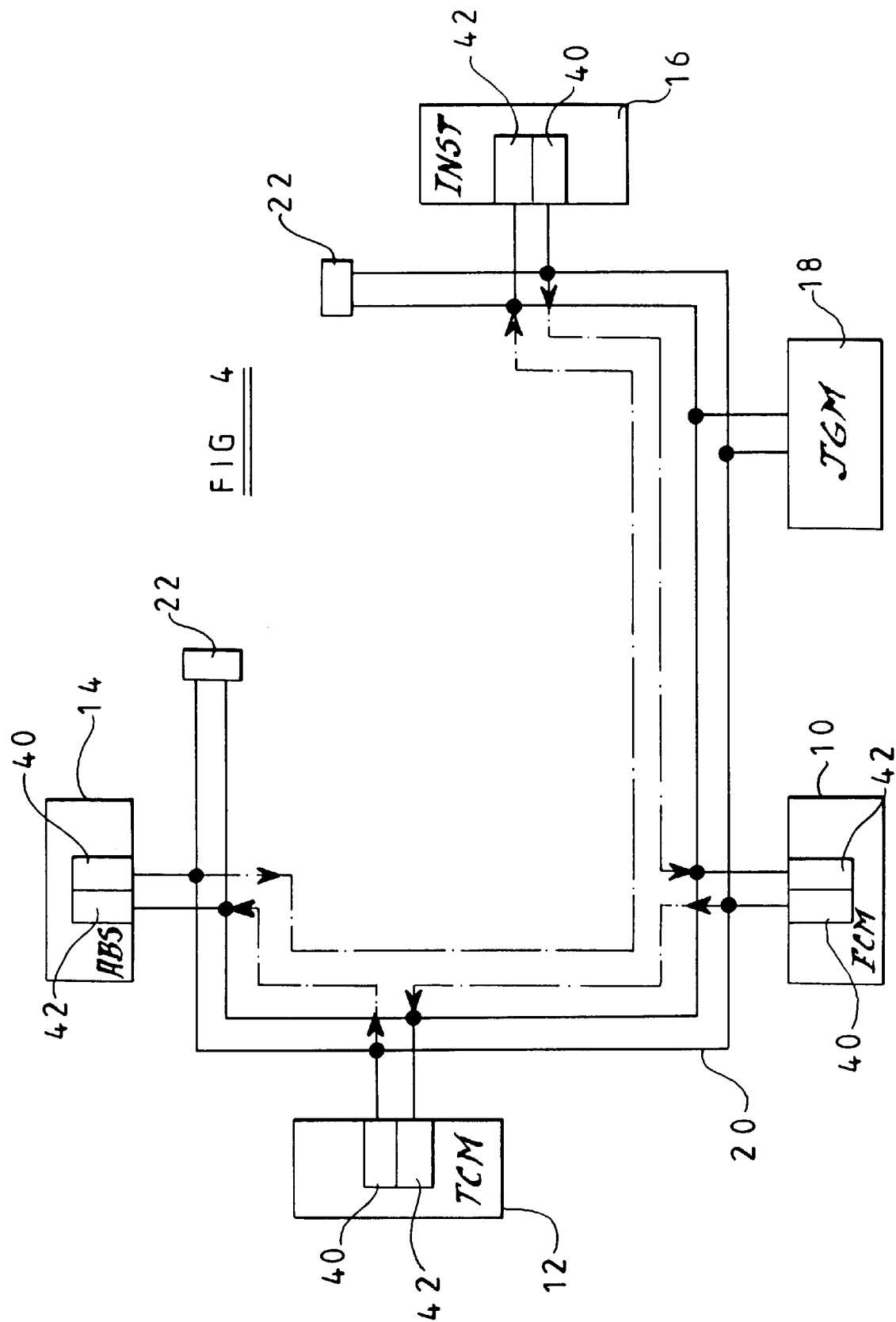

MULTIPLEXED ELECTRONIC CONTROL SYSTEMS

BACKGROUND TO THE INVENTION

The present invention relates to multiplexed electronic control systems and in particular to multiplexed control systems for motor vehicles.

With the increasing sophistication of motor vehicles, several electronic control modules are used to control the different systems of the vehicle, for example: engine control module (ECM); transmission control module (TCM); antilock braking module (ABS) and instruments and driver information module (INST). These modules monitor various control inputs and operational parameters of the related system and control the system accordingly. For example, the ECM may monitor accelerator pedal depression to control the ignition and fuel systems of the engine. The ECM may also monitor engine speed, torque and other operating parameters of the engine to optimise the performance of the engine.

Some of the controls or operating parameters monitored by one module may also be required by one or more of the other modules. For example, engine speed which is monitored by the engine control module may also be required by the transmission control module, antilock braking module and the instruments and driver information module. Furthermore, wheel speed which is monitored by the antilock braking system module may be used by the engine control module and transmission control module for traction control purposes.

The various modules are consequently interconnected in a network so that information may be interchanged between the modules and the modules can perform their functions in an integrated manner. The modules are preferably interconnected by a twisted wire pair, the interchange of information being carried out by the CAN protocol in accordance with ISO/DIS 11898 'Road Vehicles—Interchange of Digital Information—Controller Area Network (CAN) for High Speed Communication'.

A problem with networks of this type is that if one of the modules malfunctions, it may also affect the correct operation of the other modules to which it provides information. It is consequently necessary to provide means for warning of such faults, so that the network can be made aware of a problem and action can be taken to mitigate the consequences.

One method of doing this would be for all modules to monitor all of the information transmitted by all of the other modules. This however, would use excessive processing and memory resources and as most modules will only require a relatively small amount of the information transmitted, would be extremely wasteful.

SUMMARY OF THE INVENTION

In accordance with one aspect of the present invention, a multiplexed electronic control system for a motor vehicles comprises an plurality of electronic control modules, the modules being networked so that information may be transmitted from one module to another, and a network monitor. The network monitor comprising means associated with each of a plurality of the modules for generating at regular time intervals, a unique module identifying message when the module is functioning. The network monitor further includes means associated with each of the plurality of modules for monitoring the identifying message from at least one other of the modules.

In accordance with the present invention, as long as each module transmits its identifying message, the integrity of the network can be confirmed and the information transmitted from one module to another may be used to control the various systems of the vehicle. If, however, one of the modules malfunctions or there is a disruption in the network bus, so that no identifying message is transmitted or the identifying message is not received, then the other modules in the network may assume an appropriate default strategy.

In accordance with the present invention, each module, at most, has to monitor one identifying message from each of the other modules in the network, thereby minimising the processing and memory resources used for the network monitor. Furthermore, the number of identifiers used and the loading of the network bus with network management messages is minimised.

In addition to indicating appropriate functioning of the modules and the integrity of the network bus, the identifying messages may also identify that the correct module is fitted. Furthermore, if a module malfunctions intermittently, so that its identifying message appears and disappears, the network monitor may log it as an intermittent fault on suitable non-volatile memory, which may be interrogated with suitable diagnostic equipment, when the vehicle is being serviced.

According to a preferred embodiment of the invention, each module of the multiplexed electronic control system monitors the identifying message of all the other modules in the system. In this manner, each of the modules will know if any of the other modules are malfunctioning and may set appropriate default values for the information which it requires from the malfunctioning module.

According to an alternative embodiment of the invention, the modules may be connected in a logic ring, in which the identifying message from each module is monitored only by a different one of the other modules and so on, until the identifying message of the last module is monitored only by the first module. In this embodiment, each module originates a unique message which is passed around the ring and finally back to the originating module. If consequently a module receives back the message it originated then it can assume that the network is intact and all the modules are functioning correctly. If however the message does not get back to the originating module then the module knows that there is a fault on the network and the module may operate in default mode.

BRIEF DESCRIPTION OF THE DRAWINGS

The invention is now described, by way of example only, with reference to the accompanying drawings, in which:

FIG. 3 is a diagrammatic illustration of the network monitor used in the multiplexed control system illustrated in FIG. 1; and FIG. 4 is a diagrammatic illustration of an alternative form of network monitor that may be used in the multiplexed electronic control system illustrated in FIG. 1.

DESCRIPTION OF A PREFERRED EMBODIMENT

Figure 1:
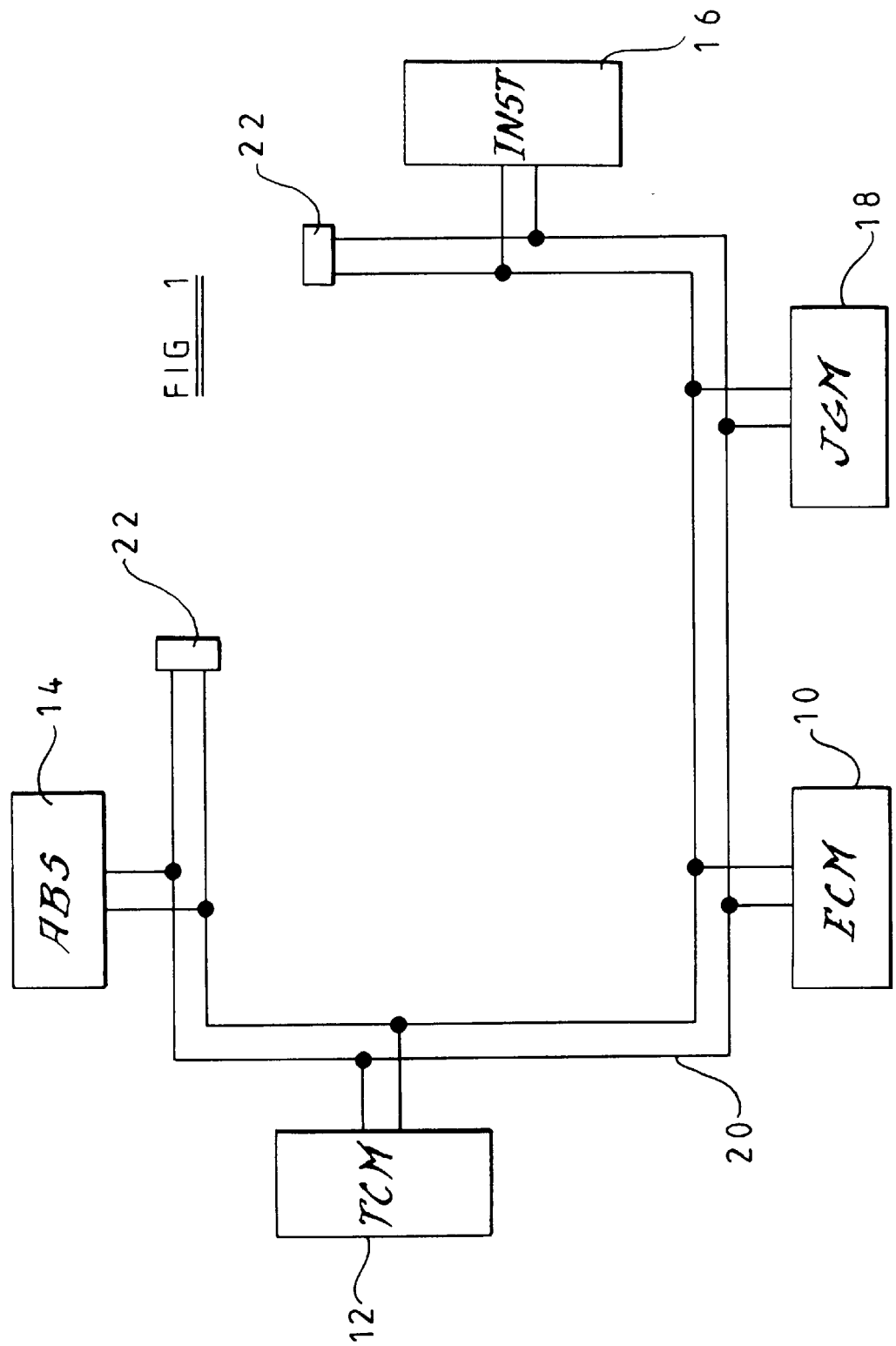
FIG. 1 is a diagrammatic representation of a multiplexed electronic control system for a motor vehicle, in accordance with the present invention.

FIG. 1 illustrates an integrated electronic control system for a motor vehicle, in which an engine control module 10;

transmission control module 12; antilock braking module 14; instruments and driver information module 16 and J-Gate illumination module 18 are networked together over a twisted wire pair 20. Terminators 22 are provided at each end of the network bus 20.

Figure 2:
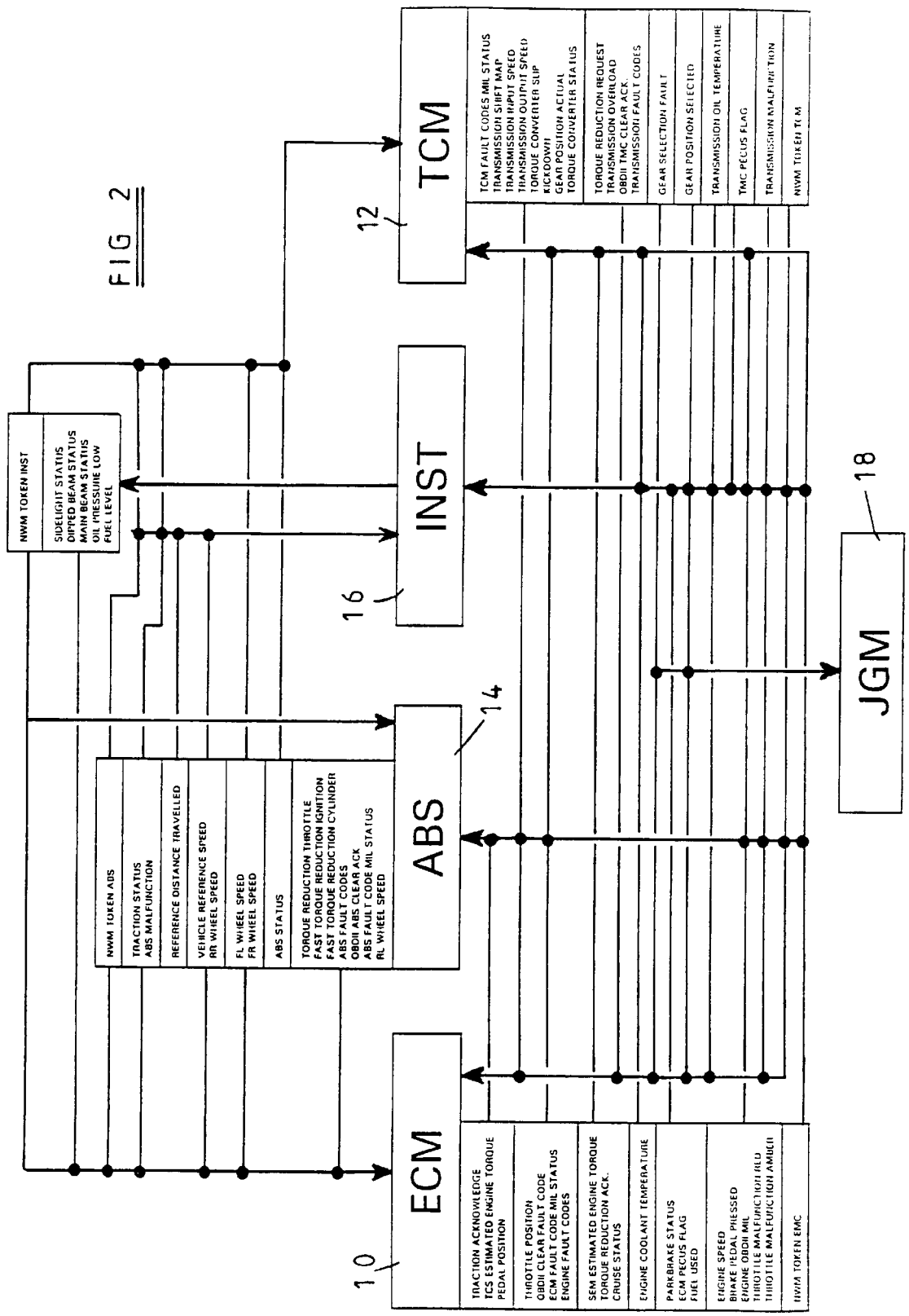
FIG. 2 illustrates diagrammatically, the flow of information between the various modules in the system illustrated in FIG. 1.

As illustrated in FIG. 2, the engine control module 10; transmission control module 12; antilock braking module 14 and instruments and driver information module 16; produce signals which may include sensor data, switch data and real time control data, which are transmitted by the network to one or more of the other modules. For example, the engine control module 10 produces signals with information relating to; traction acknowledgement, TCS estimated engine torque and pedal position, which are transmitted to the antilock braking system module 14; throttle position, OBD II clear fault code, ECM fault code MIL status and engine fault codes which are transmitted to the transmission control module 12 and antilock braking system module 14; SEM estimated engine torque, torque reduction acknowledgement and cruise status which are transmitted to the transmission control module 12; engine coolant temperature which is transmitted to the instruments and driver information module 16 and transmission control module 12; park brake status, ECM pecus flag and fuel used which are transmitted to the instruments and driver information module 16; engine speed, brake pedal pressed, engine OBD II MIL, throttle malfunction red and throttle malfunction amber which are transmitted to the transmission control module 12, antilock braking system module 14 and instruments and driver information module 16.

These signals are used by the modules 10, 12, 14, 16 and 18 to which they are transmitted, to control functions of the systems associated with those modules, for example the transmission of drive from the engine to the vehicle wheels, the braking system and the instrumentation of the vehicle.

The network runs at 500 Kbps and uses CAN protocol in accordance with ISO/DIS 11898.

With this system, the correct functioning of the system controlled by one module, for example the traction control module 12, will depend on the information received from the other modules, that is the engine control module 10 and antilock braking system module 14. While there is provision to send fault codes from one module to another, it is necessary to monitor the network as a whole in order to ensure that all the modules are on the network and the network bus 20 is intact. The network monitor may then serve to warn the driver that a fault exists and may inform the other modules on the network, so that appropriate default values may be used and the various systems controlled by the module may be operated safely.

As illustrated in FIG. 3, in one embodiment of the present invention a network monitor comprises means 30 associated with each module 10, 12, 14 and 16 to generate a unique module identification token. This token is transmitted to all the other modules on the network and each module 10, 12, 14 and 16 is provided with means 32 for monitoring the token transmitted from each of the other modules, 10, 12, 14 and 16 or at least from those modules 10, 12, 14, 16 from which the module receives data.

The tokens are transmitted from each module 10, 12, 14, 16 at 200 millisecond intervals. Each module 10, 12, 14, 16 in the system determines the status of the network approximately once every 500 milliseconds by checking that it has received tokens from the other modules. If the module is functioning correctly, then a token should have been received at least twice in the period between checks.

If the token from one or more modules has not been received in the 500 millisecond window, then the network monitor may authorise the use of default values for the information that is normally received from missing module or modules. Alternatively, when the network monitor detects a fault on the network, all the modules may use default values which will permit the system they control to function predictably and safely on a stand alone basis.

If a module is detected as missing but then recovers during the same journey, ie the token reappears, it is logged by the detecting modules as an intermittent fault, on non-volatile memory means 34, for example an EEPROM. The non-volatile memory means 34 associated with each of the modules 10, 12, 14, 16 keep account of the number of intermittent faults of each of the other modules and may be interrogated by suitable diagnostic equipment, when the vehicle is serviced. The non-volatile memory means 34 may be reset after the module has been serviced and the fault corrected.

The unique identifying token of each module contains one byte of information. This byte of information contains coded information which reflects:

1. the vehicle model;
2. the function of the module for example ECM, TCM, ABS or INST;
3. the development phase of the module.

The monitoring means 32 of the network monitor can consequently also confirm that correct modules have been installed during manufacture or replacement of parts during servicing. Means may also be provided on the instrument pack for displaying a message 'Wrong part fitted', if this is detected by the network monitor.

The network described above is not permanently powered and consequently does not require a sleep mode to prevent battery drain. However, to ensure that a predictable system is achieved, communication between modules 10, 12, 14, 16 is specified to take place within defined limits and this prevents the network monitor from flagging phantom problems. Default values of data are used during the initiation phase at start-up so that predictable states are entered as the system becomes alive and before fully integrated operation takes over.

When the system is powered down, there is again a limit specified at which the modules must cease to communicate. This will avoid the false flagging of faults when, for example, the failing signals from one module as it is powering down may be misdiagnosed by another module which is undergoing a longer power down period.

Also during the cranking cycle, in some cases supply voltage will dip below specified operating voltages. Under these conditions, one or more of the modules may undergo a reset and will cease to communicate with the other modules during its reset period.

In accordance with an alternative embodiment of the invention as illustrated in FIG. 4, a network monitor may include means 40 associated with each module 10, 12, 14 and 16, for generating a token with a unique identifier and transmitting the token on the network bus, each module 10, 12, 14, 16 having means 42 for receiving a token from a different one of said other modules and retransmitting the token with its own unique identifier. For example, the engine control module 10 transmits a token with an identifier which is unique to the engine control module 10. This token is transmitted on the network but is only picked up by the transmission control module 12. Upon receipt of the token from the engine control module 10, the transmission control module 12 strips off the unique identifier of the engine control module 10, replaces it with its own unique identifier and then retransmits the token. The amended token is then picked up by the ABS module 14 and retransmitted with an ABS unique identifier and then by the instruments and driver information module 16 and retransmitted with an instruments and driver information unique identifier. The amended token with the instruments and driver information module unique identifier is finally picked up by the engine control module 10.

In addition to the unique identifier which serves as an address for the token, the token which originates with each of the modules 10, 12, 14 and 16, also includes data comprising a unique number for each module on the network and the fault code which may indicate that there is a network fault or that the network is ok.

At 200 millisecond intervals, but at different times, each of the modules 10, 12, 14, 16 originates a token. For example, the engine control module 10 will originate a token which includes its unique identifier and a message which states that it is module 1 and the network is ok. 50 milliseconds later, the transmission control module 12 may originate a token which includes its unique identifier and a message which states that it is module 2 and the network is ok. As the token originated by each of the modules 10, 12, 14 and 16 is passed from one module to the next, while the identifier is changed, the message is not and consequently if the network is intact, the message it originated will eventually be received back by the originating module. However, if the network is not intact, that is one of the modules is malfunctioning or there is a break in the network bus, then the message will not get back to the originating module. If consequently each module receives the message it originated, it will know that the network is intact and the other information transmitted on the network can be used to run the vehicle systems in an integrated manner. If, however, the message does not get back to the originating module, then it is known that there is a fault on the network and all the modules will go to default values for the information they would under normal operation receive from the other modules, so that the modules will then operate in a stand alone mode. Typically, it will take a token about 1 millisecond to travel back to the originating module.

As a check procedure, the modules may only go to default mode after two successive tokens have not been returned to the originating module.

Instead of going into full default mode as described above, when one module detects a network fault, it may then look at the tokens it has received which have been originated by the other modules and adopt default values only for the information from modules from which it has not received messages.

If there is an intermittent fault on the network, so that a message gets back to its originating module intermittently, this fact may be recorded on nonvolatile memory means for diagnostic purposes, when the vehicle is serviced.

As with the embodiment illustrated with reference to FIG. 3, provision may be made to limit communication between modules 10, 12, 14 and 16 to take place within specified limits during start-up, power down and cranking, in order to avoid false flagging of faults.

While in the above embodiments tokens are transmitted from each module at 200 millisecond intervals, any appropriate time interval may be used. The checking interval should be at least twice the transmission interval so that the absence of at least two tokens is required before a network fault is detected.

While the invention has been described with reference to the CAN protocol, the invention is equally applicable to other protocols, for example VAN and J1850.

We claim:

1. A multiplexed electronic control system for a motor vehicle comprising a plurality of electronic control modules, the modules being networked so that information is transmitted from one module to another, and a network monitor in each module; said network monitor comprising means associated with each of a plurality of said modules for generating at regular intervals, a unique module identifying message comprising unique identifier information which reflects the function of the associated module and vehicle model when each module is properly functioning and means associated with each of said plurality of modules for monitoring the identifying messages received from the other modules to determine which module has malfunctioned due to the absence of its unique identifier information from its identifying message.

2. A multiplexed electronic control system according to claim 1 in which each module of the multiplexed control system monitors the unique module identifying message generated by all the others of said plurality of modules of the system.

3. A multiplexed electronic control system according to claim 1 in which the identifying message from each of said plurality of modules of the multiplexed electronic control system is monitored only by a different one of the other of said plurality of modules.

4. A multiplexed electronic control system according to claim 3 in which the unique identifying message generated by each of said plurality of modules comprises both a token including a module unique identifier and a message which includes details of the module from which it originated and the system status.

5. A multiplexed electronic control system according to claim 4 in which the receiving module identifies the unique identifier in the message and upon receipt of the message strips off the unique identifier and substitutes its own unique identifier, before retransmitting the message.

6. A multiplexed electronic control system according to claim 1 in which when one module fails to receive one or more expected identifying messages said one module assumes default values for the information it expects to receive from the other modules.

7. A multiplexed electronic control system according to claim 6 in which when a module fails to receive one or more expected identifying messages, it assumes default values for all the information it receives from all of the other modules in the system.

8. A multiplexed electronic control system according to claim 1 in which each module assumes default values for the information it expects to receive from the modules whose identifying messages are missing.

9. A multiplexed electronic control system according to claim 1 in which means is provided in preselected modules for recording intermittent faults in the detection of identifying messages in said regular intervals by each network monitor.

10. A multiplexed electronic control system according to claim 1 in which communication on the system is inhibited when each network monitor fails to detect identifying messages in said regular intervals beyond a predetermined time period.

11. A multiplexed electronic control system according to claim 10 in which communication of information on the system does not take place during vehicle events of startup, power down, and the cranking cycle.

* * * * *